June 1, 1937.    A. H. SCHMIDTKE ET AL    2,082,125
BASKET HANDLE MACHINE
Filed Jan. 21, 1935    10 Sheets-Sheet 8

Inventors:
Albert H Schmidtke
Paul Hintz
By Eugene M. Giles atty.

Fig. 12.

Patented June 1, 1937

2,082,125

UNITED STATES PATENT OFFICE 2,082,125

BASKET HANDLE MACHINE

Albert H. Schmidtke, St. Joseph, Mich., and Paul Hintz, Marshall, Tex., assignors to St. Joseph Iron Works, St. Joseph, Mich., a corporation of Michigan Application January 21, 1935, Serial No. 2,670

12 Claims. (Cl. 140—93)

Our invention relates to machines for making and attaching handles to baskets and has reference more particularly to improved mechanism for forming a wire handle and attaching it to the basket so that the ends of the wire which are punched through the basket rim are bent upwardly against one side of the rim and over the top thereof and downwardly against the other side of the rim.

The principal objects of our invention are to provide an improved machine for making and attaching wire handles to baskets so that the ends of the wire are hooked over the upper edge of the basket rim; to simplify the mechanism for bending the wire ends to embrace the upper edge of the basket rim; to insure an accurate feed of wire to the handle forming mechanism; and to provide facilities for rapidly making and attaching such handles to baskets, these and other objects being accomplished with the structure shown in the accompanying drawings in which,—

Figures 1, 2:
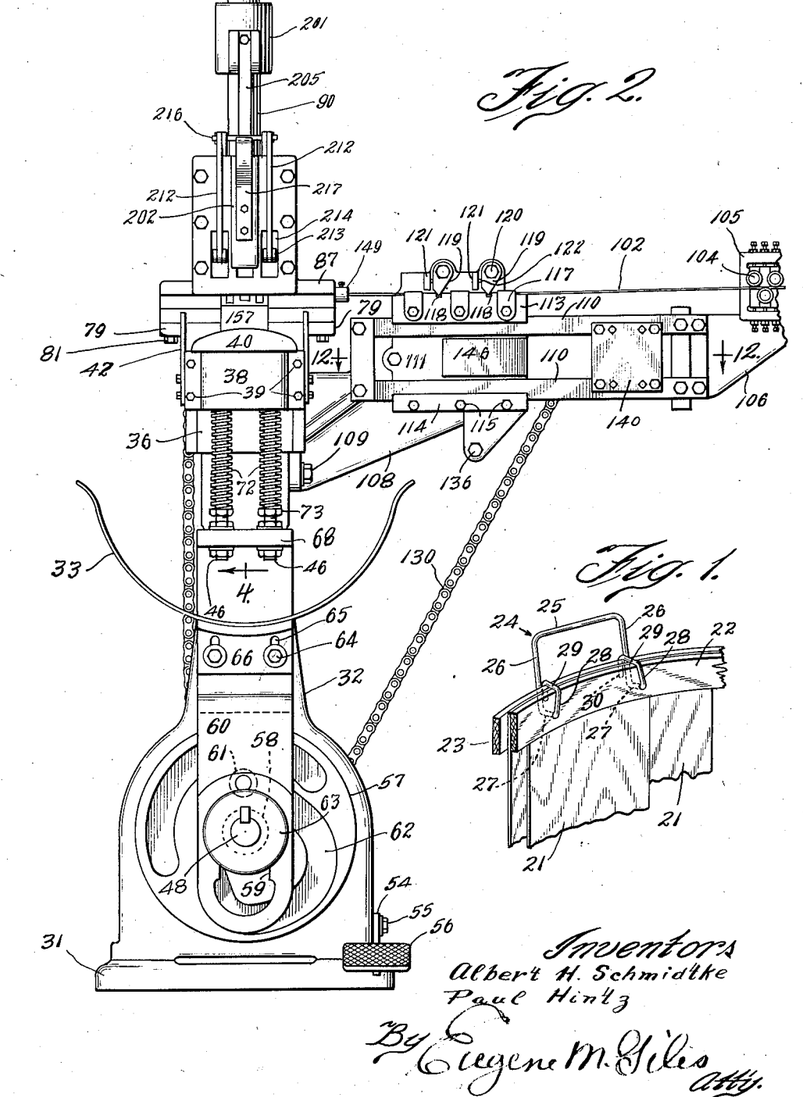
Fig. 1 is a fragmentary top portion of a basket side wall with a handle attached thereto in accordance with our invention.
Fig. 2 is a front view of a machine for making and attaching a handle such as shown in Fig. 1.
Figure 3:
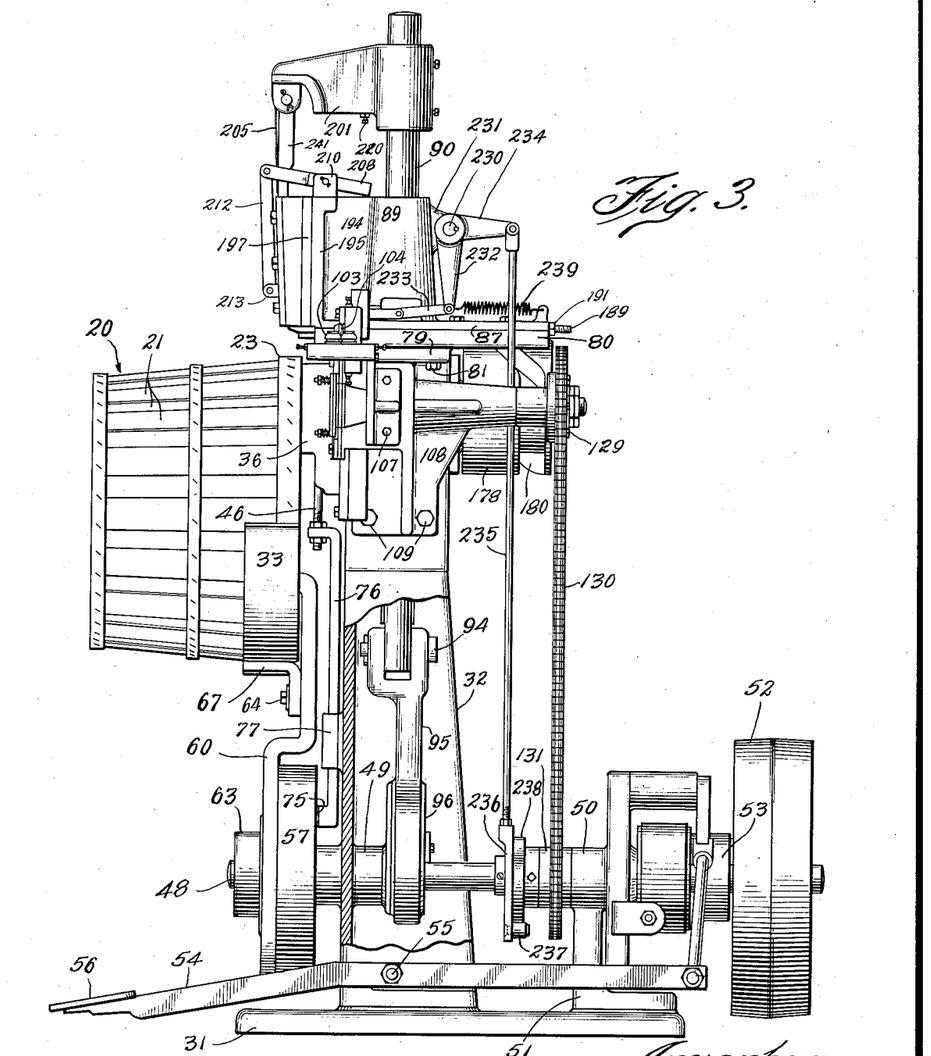
Fig. 3 is a view looking at the right side of the machine of Fig. 2, a portion of the frame being broken away to disclose details of the construction.

Referring to the drawings, it is to be understood that the basket to which the handles are attached may be of any desired type, that shown herein and for which the particular machine is designed being of the round bushel basket type such as shown at 20 in Fig. 3 and having side wall strips or panels 21, the upper ends of which are secured between inner and outer hoops 22 and 23 respectively to form the basket rim to which the basket handles are attached. The handles, one of which is indicated at 24 in Fig. 1, are of the same general form as those heretofore used, being made of wire with a middle portion 25 having legs 26 extending downwardly at the outer side of the basket rim and provided at their lower ends with inturned portions 27 which are punched through the hoops 22 and 23 and the intermediate upper ends of the side wall strips or panels 21. The two ends of the wire that project through the basket rim are bent upwardly as at 28 against the inner face of the basket rim, then outwardly as at 29 over the top edge of the basket rim and the extremities of the wire are bent downwardly as at 30 against the outer face of the basket rim and preferably at the inner sides of the handle legs 26 as shown in Fig. 1.

For attaching these handles we preferably employ a machine such as shown in Figs. 2 to 14 inclusive, in which the basket is lifted up and impaled on the attaching ends of the wire handle, the reference numeral 31 indicating the base of the machine which has a hollow standard 32 extending upwardly therefrom to provide a mounting for handle forming and attaching devices which co-operate with the basket lifter which is movably mounted on the front of the standard 32.

The basket lifter comprises a centering crescent 33 on which the basket is located in preparation for and during the handle attaching operation, and a pair of plungers 34 which are located within the basket when the latter is in position for attachment of a handle and are projected upwardly against the inside of the basket rim in the handle attaching operation. These plungers 34, which are alike and spaced apart a distance corresponding to the spacing of the handle legs 26, are mounted to reciprocate vertically in guideways 35 of an anvil bracket 36 which is secured by cap screws 37 to the front of the standard 32 near the top, said guideways 35 being closed at the front by a plate 38 which is secured by cap screws 39 to side webs of the bracket 36. This plate 38 has a shoe portion 40 extending forwardly at the top and rounded at the outer end as shown particularly at 41 in Fig. 4, to facilitate the placing of the basket in the required position for attaching the handles, which said shoe portion 40 as well as the front part of the bracket 36 enter the basket and have their top faces rounded from side to side somewhat as shown in Fig. 2 to correspond to the internal curvature of the basket side wall which is slipped thereover and rests thereon when the basket is placed in position preparatory to the handle attaching operation, a stop plate 42 being secured on each side of the bracket 36 and projecting thereabove to assist in properly locating the basket rim. Each plunger 34 is notched at the upper end to provide laterally spaced portions 43 between which a bending dog 44 is pivoted on a pin 45 so as to be located under the place where the respective end of the handle wire is punched through the basket rim and each dog 44 rests on the upper end of a shaft or rod 46 which projects upwardly through an opening 47 in the respective plunger 34.

A drive shaft 48 is mounted on the machine frame in bearings 49 and 50, the former of which is on the front wall of the standard 32 and the latter of which is at the upper end of a bracket 51 which is secured to the machine base 31, and this shaft 48 is operated from the pulley 52 through a one revolution clutch which is indicated as a whole at 53 and controlled by the lever 54 which is pivoted at 55 on the standard and provided with a pedal 56 at the forward end. Details of the construction of the clutch 53 are not shown as such clutches are well known, the arrangement being such that when the pedal 56 is depressed the pulley 52, which is operated from any suitable source of power, is clutched to and rotates the shaft 48 and when the shaft has made a complete revolution, the pedal 56 having in the meantime been released, the shaft 48 is automatically unclutched from the constantly driven pulley 52 and remains stationary until the pedal 56 is again depressed.

Fixed on the forward end of the shaft 48 in front of the standard 32 is a cam disk 57 with a forwardly extending hub like portion, indicated by dotted lines at 58 in Fig. 2, which engages the slot 59 in the lower end of the combined basket lifting and handle clinch yoke 60, and this yoke has a roller on the rear, indicated by dotted lines at 61 in Fig. 2, which engages a cam groove 62 which is suitably formed in the front face of the cam disk 57 to lift the yoke 60 at the proper time in each rotation of the shaft 48, the lower end of said yoke 60 being retained on the hub portion 58 and the roller 61 being maintained in engagement with the cam groove 62 by the collar 63 which is fixed on the shaft 48 at the forward end of the hub portion 58.

The yoke 60 has the centering crescent 33 mounted thereon by cap screws 64 passing through slotted openings 65 in the flange 66 of a bracket 67 to which the crescent 33 is attached so that said crescent is adjustable vertically on said yoke 60, and said yoke has the upper end turned out as at 68 and apertured to receive the lower ends of the stems 46 which project upwardly through the openings 47 of the respective plungers 34. The stems 46 are threaded at their lower ends and secured to the out-turned upper end 68 of the yoke 60 by lock nuts 69 which permit adjustment of said stems on the yoke. The upper ends of the stems 46 are vertically slidable in the openings 47 of the plungers 34, such sliding movement being limited by a pin 70 which extends through the stem and has the ends engaged in vertical slots 71 of the plunger 34. A heavy coil spring 72 surrounds each stem 46 and is compressed between the respective plunger 34 and a nut 73 on the stem to normally hold the plunger at the upper limit of its permitted movement on the stem and to provide clamping pressure which the plunger exerts on the basket rim in the handle attaching operation, at which time the stem 46 is projected upwardly against the tension of the spring 72 to rock the bending dog 44 and bend the wire end that is punched through the basket rim.

Figure 11:
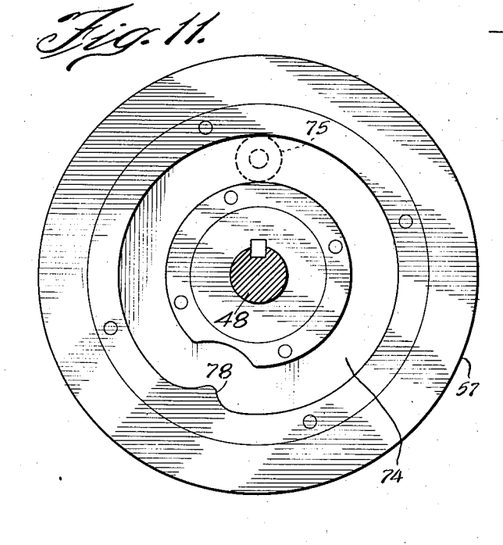
Fig. 11 is a face view of the cam that operates the handle ejector.
Figure 12:
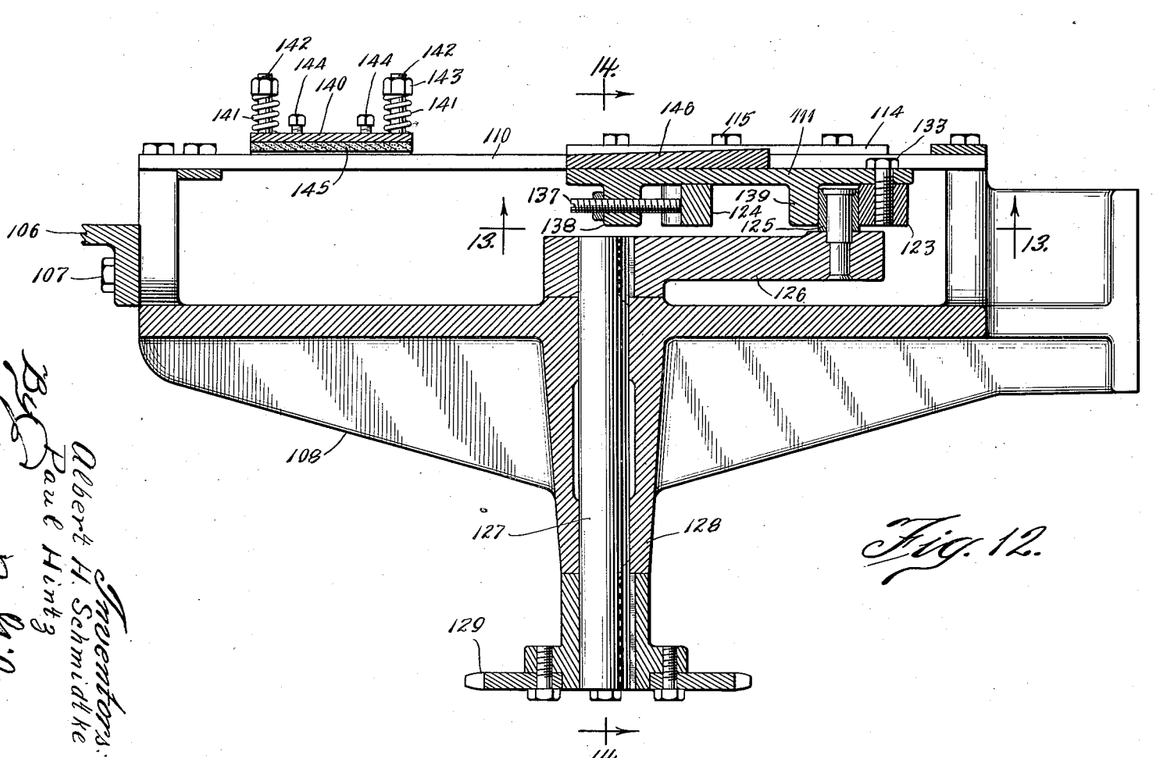
Fig. 12 is an enlarged sectional view of the handle wire feeding mechanism taken on the line 12—12 of Fig. 2.

The cam disk 57 also has another cam groove 74 which is in its rear face as shown in Fig. 11 and engaged by a roller 75 on the lower end of a bar 76 which slides vertically in a guide 77 on the front wall of the standard 32, said cam groove 74 being formed with an inwardly deflected portion 78, which at the proper time in each revolution of the shaft 48 operates a stripper, as will be more fully explained hereinafter, for removing the basket handle from the handle forming block after the handle has been attached to the basket.

Referring now to the mechanism for forming and attaching the handle, this mechanism as indicated hereinbefore is mounted on the upper end of the standard 32 which is provided with a laterally extending flange 79 at each side for this purpose. A plate 80 is secured on the top of the standard 32 by cap screws 81 which extend upwardly through the flanges 79 and are threaded into the lateral edge portions of the plate 80, which it will be observed in Fig. 3 projects rearwardly from the standard. This plate constitutes a slide-way for a plate like handle former 82 and is accordingly recessed in the top face from front to rear to receive said handle former plate 82 between lateral shoulders 83 and 84 of said plate 80, the bottom of the recess being formed as is the usual practice in such cases with slightly elevated milled faces 85 along the sides on which the plate 82 actually slides and by reason of which a space appears between the plates 80 and 82 in Figs. 4, 5 and 6 of the drawings.

For holding the handle forming plate 82 in the recess of the plate 80, the casting 86 which serves as a mounting for handle forming parts, is provided with an attaching flange 87 at the base which is substantially co-extensive with the plate 80 and secured along its lateral edges to the shouldered edge portions 83 and 84 of said plate by cap screws 88. This casting 86 has a bearing 89 directly over the standard 32 for the vertically reciprocable shaft 90 which extends downwardly through openings 91 and 92 respectively in the plate 80 and top wall of the standard 32 and through the bearing 93 of said standard, and at its lower end said shaft 90 is pivotally connected as at 94 with the link 95, the lower end of which embraces an eccentric 96 on the shaft 48, so that in each revolution of the shaft 48 the shaft 90 is reciprocated to operate a handle end bender that is carried by the casting 86.

Figure 8:
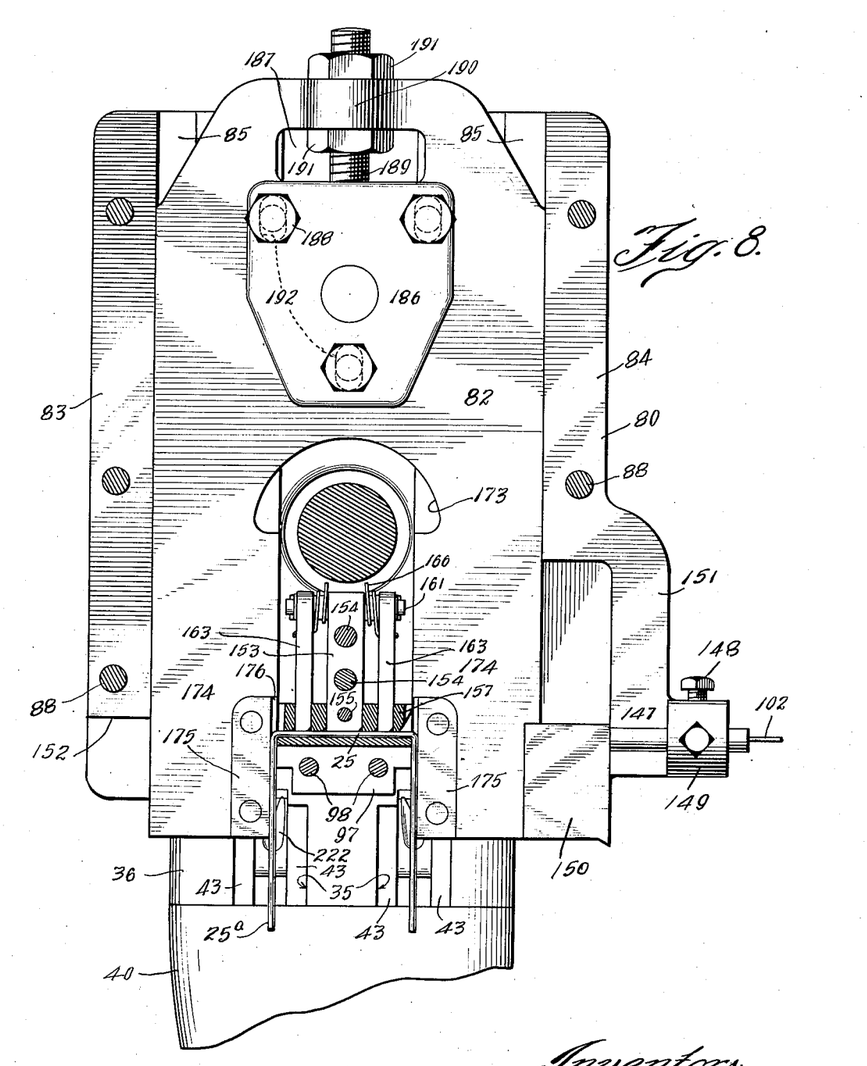

The basket handle is formed from wire that is fed laterally into the machine at suitable intervals to provide a proper length which is cut off by the former plate 82 as it starts to move forwardly from its retracted position and which said cut off length of wire is then by the further forward movement of said plate 82, bent around a former block 97 into the handle form shown at 25ª in Fig. 8, said former block 97 being rigidly secured by screws 98 to the bottom face of the casting 86 directly in front of the path of insertion of the handle wire and having an integral top rib or flange 99 along the rear edge which enters a recess 100 in the bottom face of the casting 86 and engages behind the shoulder 101 at the front of said recess.

The handle wire which is indicated at 102 is supplied from any suitable source as for example, a rotatably mounted coil (not shown) which is the usual practice, and is drawn by the feeding mechanism through a straightening device comprising a series of horizontal and vertical rolls 103 and 104 respectively mounted in a frame 105 which has an attaching portion 106 secured by cap screws 107 to the outer end of an elongated bracket 108 which is secured at its inner end by cap screws 109 to the side of the standard 32 at the upper end. A pair of spaced bars 110 are located at the front of and secured at their ends to the bracket 108 to provide ways upon which a wire feed carriage is adapted to be reciprocated, said carriage comprising a casting 111 having a recess 112 in the front face for the rails 110 which are overlapped by the upper and lower plates 113 and 114 respectively, these plates being secured by cap screws 115 to the shoulders of the casting 111 that are above and below the recess 112 and serving to hold the casting on the rails or ways 110.

The upper plate 113 has a longitudinal groove 116 in the top edge to provide a channel for the wire 102 which is held therein by overlying portions of clips 117 which may be attached by the same cap screws 115 which are employed for mounting the upper plate 113 and between the clips 117 the top edge of the plate 113 is notched transversely as at 118 to admit the pointed ends of pawls 119 which serve in the movement of the carriage inwardly toward the standard 32 to grip the wire 102 and feed it to the handle forming mechanism. These pawls are pivoted to swing freely on pivot pins 120 which are threaded into the top portion of the casting 111 which has a lug 121 at the machine side of each pawl 119 between which said lug and pawl is interposed a spring 122 at suitable tension to insure gripping engagement of the pawl with the wire 102 so as to feed the wire to the machine when the carriage is moved toward the standard 32 and to permit release of the pawl so that it slides along the wire in the reverse movement of the carriage at which time the wire is held against retrograde movement by the resistance offered thereto by the series of straightening rolls 103 and 104.

Figure 13:
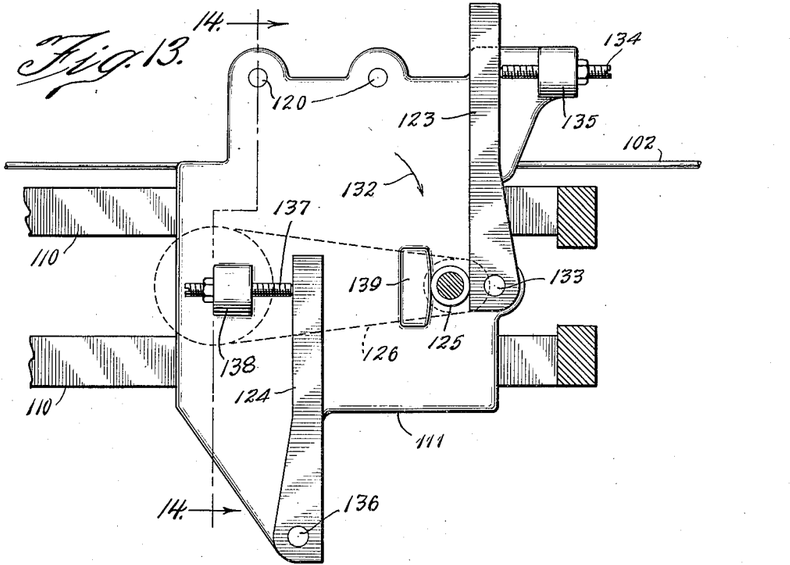
Fig. 13 is a view partly in section taken on the line 13—13 of Fig. 12.
Figure 14:
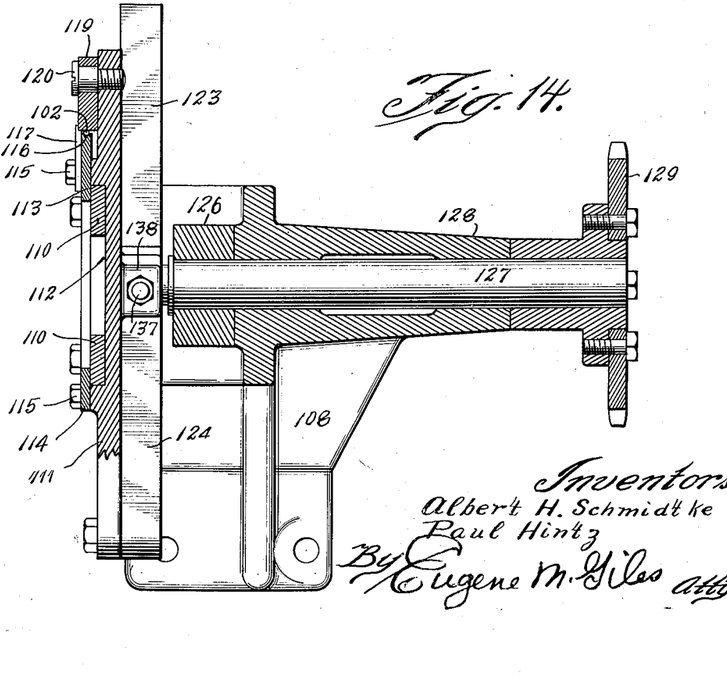
Fig. 14 is a sectional view on the lines 14—14 of Figs. 12 and 13.

For operating the carriage 111 to feed the exact length of wire required for each basket handle, the carriage casting 111 is provided on the rear face with a pair of adjustable abutments or wiper arms 123 and 124 which are positioned to be engaged by a roller 125 on the outer end of a crank 126 that is fixed on the forward end of a shaft 127 that extends rearwardly through a bearing 128 of the bracket 108 and is provided on its rear end with a sprocket 129 which is driven by the chain 130 from a sprocket 131 on the drive shaft 48 of the machine so that the crank turns in the direction indicated by the arrow 132 in Fig. 13.

The abutment or wiper arm 123, which is engaged by the roller 125 in the first half of the down stroke of the crank for moving the carriage to feed the wire, is clamped against the rear face of the carriage casting 111 by a cap screw 133 at its lower end, and at its upper end said arm is braced against a screw 134 which is threaded through a lug 135 of the casting, and may be adjusted to provide a slight regulation of the forward position to which the carriage is impelled by the crank 126 and roller 125.

The other abutment or wiper arm 124, which is engaged by the roller 125 in the first half of the upstroke of the crank for retracting the carriage to grip the wire farther back in preparation for feeding another handle length, is likewise clamped against the rear face of the carriage casting 111 by a cap screw 136 at its lower end and the upper end of this arm 124 is braced against a screw 137 which is threaded through a lug 138 of the casting. Inasmuch as the final retracting impulse of the crank 126 and roller 125 is applied at the upper end of this arm 124 a considerable variation in the distance of retraction of the carriage may be obtained by adjustment of the screw 137 and, as the length of wire that is fed is determined by the distance the carriage is retracted, a corresponding variation results in the length of handle wire that is fed to the machine.

In the feeding movement of the carriage the wire is drawn through the wire straightening device 105 and as this offers sufficient resistance to prevent forward overthrow of the carriage by the feeding operation of the crank 126 and roller 125 the carriage casting 111 is merely provided on its rear face with a lug 139 in front of which the roller 125 passes as it engages the lower end of the wiper arm 123. In the retractile movement of the carriage, however, no such resistance is encountered and in order to stop the carriage accurately and without rebound at the desired final position of retraction, a friction device is provided which effects a braking action on the carriage as it nears the end of its retractile movement, with the result that the carriage must be pushed to the final retracted position by the engagement of the crank roller 125 with the wiper arm 124 and the final retracted position of the carriage is accordingly accurately controlled by the adjustment of the upper end of the arm 124.

For effecting this braking action on the carriage a plate 140 is slidably mounted on stems 142 which project forwardly from the rails 110 and have coil springs 141 thereon which are held under tension by nuts 143 so that they press the plate 140 toward the rails 110, such movement of said plate being limited however, by cap screws 144 which are threaded through the plate 140 and engage against the rails 110. A facing 145 of friction material is secured to the inner face of the plate 140 and on the outer face of the carriage casting 111 between the rails 110 is a tapered shoe 146 which in the retractile movement of the carriage slides behind and engages the friction facing 145 of the plate 140 in a wedge like manner so as to impose a frictional resistance to the final retractile movement of the carriage, it being understood, of course, that the time and extent of the frictional resistance may be varied by adjusting the spacer screws 144 and the spring tension nuts 143.

Figure 7:
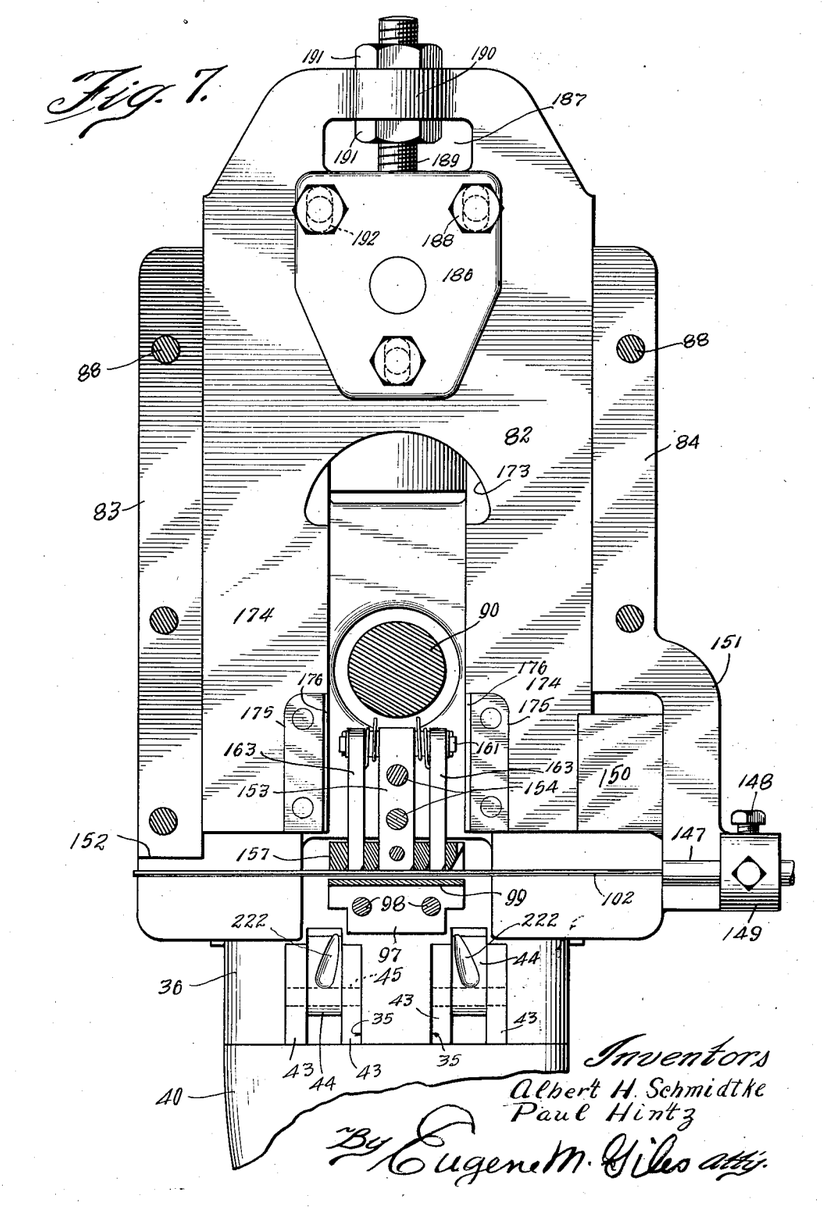
Figs. 7 and 8 are enlarged views, partly in section, on the line 8—8 of Fig. 4, Fig. 7 showing the handle forming mechanism in position preparatory to formation of a handle and Fig. 8 showing the mechanism at the completion of the handle forming operation as it appears in Fig. 4.

The wire 102 is fed by the carriage 111 into the machine through a wire cutting tube 147 which is secured by screws 148 in a tubular boss 149 on the side of the plate 80, said wire being projected across the forward end of the slide-way in said plate and in front of the retracted handle former 82 which has a cutter block 150 secured on the lateral edge at the forward end and which said cutter block 150 in the forward movement of the former 82, co-operates with the inner end of the cutter tube 147 to cut off the length of wire which is to constitute a basket handle, the side shoulder 84 of the plate 80 being offset as at 151 to accommodate the cutter block 150 and the other side shoulder 83 of said plate 80 being terminated at 152 to permit clearance for the inner end of the wire 102 when inserted in position as shown in Fig. 7 to provide a handle blank.

Figure 4:
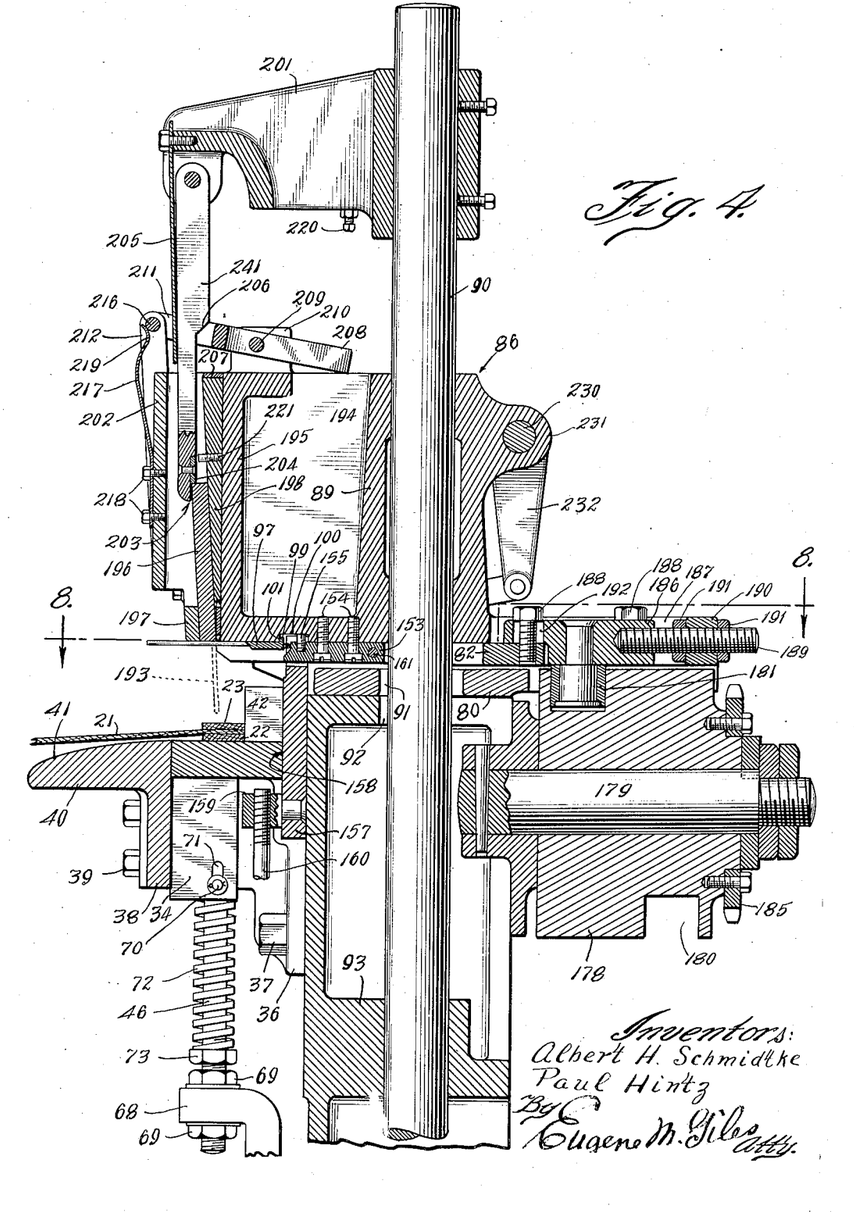
Fig. 4 is an enlarged vertical section of the upper portion of the machine taken on the line 4—4 of Fig. 2.
Figure 9:
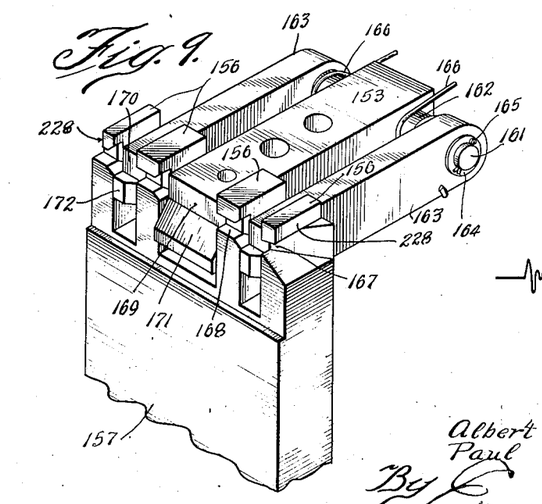
Fig. 9 is a detail perspective view of the mechanism that holds the handle wire during the forming operation.
Figure 10:
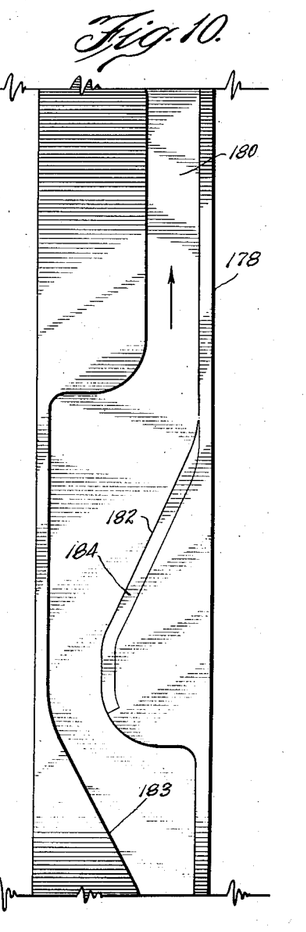
Fig. 10 is a plan view of the peripheral surface of the cam that operates the handle forming slide.

For holding the cut off length of wire in the position it is to occupy in the handle forming operation and to guide the wire to this position in the inserting operation, a composite structure as shown in Fig. 9 and of the same total width as the former block 97 is provided with a sort of sectional wire channel immediately behind and closed at the front by said former block 97, the middle element of this structure being a deflector block 153 which is firmly secured by screws 154 to the bottom of the casting 86 with an adjustable screw stud 155 at the front end projecting upwardly into and bearing against the top wall of the recess 100 of said casting as shown in Fig. 4. At each side of the forward end of the block 153 are two spaced fingers 156 which are integral extensions of a stripper plate 157 which is mounted to slide vertically in a guide notch 158 that is formed in the rear of the plunger bracket 36 and holds said stripper plate in sliding engagement with the upper portion of the front wall of the standard 32, and this stripper plate has a lug 159 secured to and projecting forwardly from its lower end and connected by a threaded adjusting rod 160 with the upper end of the cam operated bar 76 so that the stripper plate 157 is normally held in its elevated position in which the upper ends of the fingers 156 project into the recess 100 in the under side of the casting 86 and is pulled downwardly at a prescribed time in each revolution of the shaft 48 by the offset portion 78 of the cam groove 74 in the rear face of the cam disk 57.

A pintle 161 extends transversely through the rear end of the deflector block 153 which is provided with laterally extending hubs 162 serving as spacers for a pair of rocker arms 163 which are held on the opposite ends of the pintle by washers 164 and cotters 165 and have their forward ends located between the respective pairs of fingers 156. A coil spring 166 surrounds each hub 162 and has an end thereof engaged under and exerting a lifting tension on the adjoining arm 163 to normally hold these arms in a level position against the bottom face of the casting 86.

Aligning notches are provided in the front edges of the fingers 156 one of which said notches is indicated by the reference numeral 157 and the others by the reference numeral 168, said notches being in line with the wire 102 which is passed therethrough as it is fed into position preparatory to the formation of each basket handle, said notches being at the time located directly behind and closed at the front by the rear face of the former block 97 and the notch 167 through which the end of the advancing wire 102 first passes being flared downwardly and rearwardly as shown in Fig. 9 to direct the wire end therethrough and to the other succeeding notches 168 which merely have their upper and lower entering edges beveled as shown in said figure.

The stationary deflector block 153 and arms 163 have vertical front end faces 169 and 170 respectively which are substantially at the elevation of and in the plane of the back walls of the notches 168 and the inner edge of the back wall of the notch 167 so that said faces 169 and 170 and the back walls of the notches 168 afford substantially a continuous transverse surface to which the end of the wire is guided by the rearwardly flared rear face of the notch 167 and along which said surface the wire end slides in the wire feeding operation. The deflector block 153 has an inclined ledge 171 and the arms 163 have shoulders 172 just below the normal level of the notches 168, all as shown quite clearly in Fig. 9, the inclined ledge 171, which is stationary, and the shoulders 172 which may swing downwardly with the arms 163 against the tension of the springs 162 serving in the downward movement of the stripper plate 157 after each basket handle is completed and attached to the basket, to cooperate with said stripper plate 157 in dislodging and ejecting the completed basket handle from behind the former block 97.

The handle former plate 82, which as before indicated, cuts off the length of handle wire and bends it around the former block 97, is bifurcated as indicated at 173 to provide laterally spaced flat arms 174 which straddle the upright shaft 90 and the handle wire holder 153, 156 and 163 and the forming block 97 and each arm 174 has at its forward end along the inner side a wire bending insert 175 which, in the forward movement of the former plate 84, slides close along the respective side of the former block 97, and each insert 175 has a longitudinal groove 176 along the inner edge at the top to accommodate the respective leg of the handle as said leg is bent forwardly by said insert along the side of the former block 97 as shown in Fig. 8.

For operating the handle former 82 a cylindrical cam 178 is mounted on a spindle 179 that projects rearwardly from the upper end of the standard and has a circumferential cam groove 180 engaged by a roller 181 that is secured to and extends downwardly from the plate 82 near the rear end, and said cam 178 is rotated in proper timed relation with the drive shaft 48 and the cam groove 180 is suitably formed to co-operate with the roller 181 and project the handle former 82 forwardly to the position shown in Fig. 8 at the required time to cut off and bend a piece of the wire 102 in handle form and to retract said former to the position of Fig. 7 after the handle has been formed and attached to the basket. The cam groove 180, as shown by the developed view thereof in Fig. 10, has the oppositely inclined faces 182 and 183, the former of which acts on the roller 181 to project the handle former 82 forwardly to cut off and bend the handle wire and is preferably provided with a replaceable facing 184, while the inclined face 183 acts on the roller 181 to retract said former plate 82, said inclined faces being caused to move past the roller 181 in the direction of the arrow of Fig. 10 by rotation imparted to the cam 178 through the chain 130 which is passed around a sprocket 185 that is secured to the rear end of the cam 178, it being understood that all of the sprockets 129, 131 and 185 are of the same size so that the handle wire feed shaft 127 and the cam 178 rotate in unison with the drive shaft 48.

In order to permit adjustment for varying the extreme forward position to which the former plate 82 is projected by the cam 180, the roller 181 is not attached directly to the plate 82 but to a mounting member 186 which is located in an opening 187 at the rear of the plate 82, to which said member is secured by the cap screws 188. A threaded stem 189 projects rearwardly from the member 186 through a bridging 190, at the rear of the plate 82 and has clamping nuts 191 thereon for adjusting the member 186 forwardly and rearwardly on the plate 82, the openings 192 of the member 186 through which the cap screws are passed being slotted for this purpose.

Figure 5:
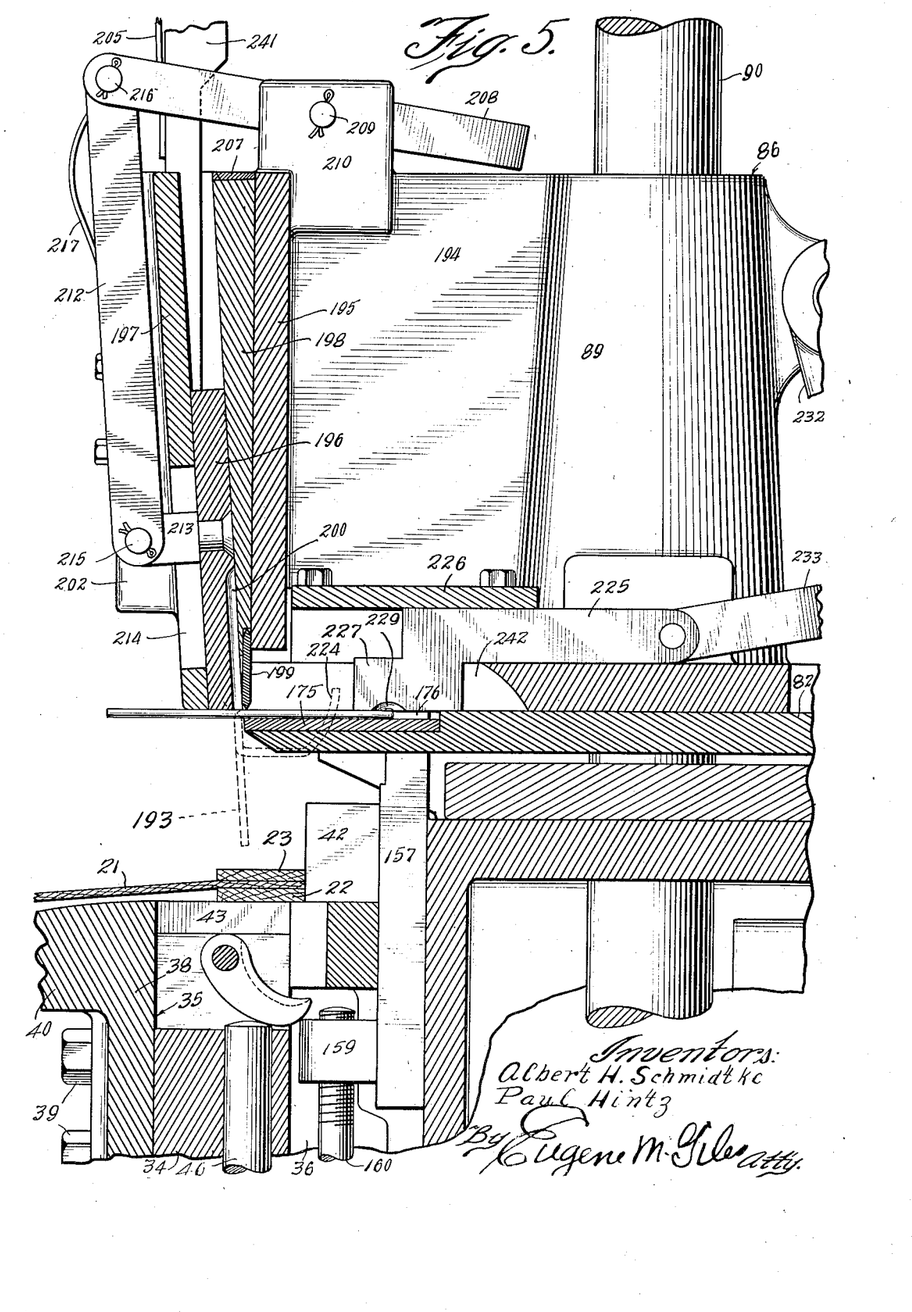
Fig. 5 is an enlarged sectional view of the mechanism for forming and attaching the handle to the basket, said mechanism being shown at the completion of the bending of the wire into the handle form and before the ends of the wire are bent laterally for punching through the basket rim.

After the handle wire has been bent by the former plate 82 to the form shown at 25ª in Fig. 3, and while the former plate is in the forwardly projected position of Figs. 4, 5 and 8 and supporting the legs of the formed handle wire, the end portions of the legs which project beyond the former plate 82 as shown in said figures are bent downwardly against the end of the former plate to the position shown by dotted lines at 193 in Figs. 4 and 5 ready for penetrating the basket rim which is thereafter lifted up by the plungers 34 and impaled on these downturned ends 193.

The bending mechanism for the handle wire ends 193 is mounted on the front of the casting 86 which is formed with a forwardly extending web 194 which has a slide-way housing 195 at the front for the bending plate 196 which is held therein by the cover 197. A tapered plate 198 is secured in the channel or slide-way of the housing 195 so that the lower end thereof is just above the outer ends of the arms 174 of the handle forming slide 82 when the latter is in the outwardly projected position, and this plate 198 has a hardened bearing edge member 199 secured to its lower end and engaging over the legs of the handle wire immediately back of the place where the bend occurs in bending the ends of the handle legs downwardly.

The bending plate 196 is positively propelled downwardly in the bending operation by a releasable connection with the shaft 90 and is returned to the initial position by the work as the latter is raised and impaled on the downturned wire ends 193, said plate 196 having grooves 200 in which the wire ends are turned downwardly and by which these ends are supported during the impaling operation. The releasable connection for operating the bending plate comprises a push bar or latch 241, which is pivoted to the outer end of a bracket 201, on the shaft 90 and extends downwardly within an enlargement 202 of the cover 197 in a position to engage the upper edge of the bending plate 196, said push bar being provided for this purpose with a notch 203 at its lower end with hardened shoulder 204 which is normally held by a plate spring 205 in position to engage the upper edge of the bending plate 196, and said push bar has a beveled shoulder 206 which at the proper time in the downward movement of the push bar, engages the contact plate 207 at the upper end of the tapered plate 198 and releases the lower end of the push bar 241 from the bending plate 196.

It is desired to resiliently maintain the bending plate 196 thereafter in its lowermost position and at the same time to permit it to yield as the basket rim is impaled on the downturned handle leg ends 193 and to insure positive return of said plate 196 to its upper starting position, and for this purpose a lever 208 is pivoted at 209 between lugs 210 at the upper end of the web 194 and has a forked forward end or yoke the arms 211 of which straddle the push bar 241 and are connected by links 212 with the plate 196 at opposite sides of the enlargement or bulge 202. The plate 196 is provided for this purpose with a pivot stud 213 at each side of said bulge 202 which said stud projects through a slot 214 in the cover plate 197 and is provided at its outer end with a pair of pivot lugs between which the lower end of its respective link 212 is pivoted as at 215 and the upper ends of these links are pivoted on the respective ends of a pivot pin 216 which extends between the ends of the yoke arms of the lever 208.

A plate spring 217 is secured at 218 to the front of the bulge 202 of the cover plate 197 and at its upper end has a hump 219 located between the upper and lower extremities of movement of the pin 216 and bearing thereagainst so as to resiliently hold the lever 208 in each extremity of its pivotal movement and when the bending plate 196 has been projected downwardly to bend the ends of the handle wire downwardly, the hump 219 engages over the pin 216 and yieldingly holds said plate 196 in its lowermost position, but permits said plate to slip back upwardly along the downturned wire ends 193 against the resistance of the spring 217 as required when the basket rim is lifted up and impaled on said wire ends. To insure positive return of the plate 196 to the starting position after the handle has been attached, a set screw 220 is threaded into the under side of the bracket arm 201 in position to strike the rear end of the lever 208 as the shaft 90 nears the end of its down stroke and thereby throw the forward end of said lever up so that the plate 196 is lifted to the elevated position and the pin 216 engaged with the spring 217 above the hump 219. A stop pin 221 limits the inward swinging of the push bar 241 so as to insure positioning of the notch 203 to engage with the upper edge of the plate 196.

After the wire ends 193 have been turned downwardly, the plungers 34, which are located respectively under the downturned handle ends 193, are lifted to impale the basket rim on said downturned handle ends and to bring the bending dogs 44 into position to deflect the wire ends toward the upper edge of the basket rim as said ends penetrate through the basket rim, the cam 178 being suitably timed to withdraw the outer ends of the handle former plate 82 from under the wire handle at that time so as to permit the basket rim on the plungers to be clamped against the under side of the outer end portions of the handle legs which are in turn clamped against the lower edge of the bearing member 199. Each of the bending dogs 44 has a groove 222 in the top face arranged as shown in Figs. 7 and 8 to deflect the wire ends slightly toward one another so that these ends may be turned over the upper edge of the basket rim at the inner sides of the handle legs 26 as shown in Fig. 1, and these bending dogs 44, which occupy the position shown in Fig. 5 during the elevation of the plungers 34 and basket rim thereon, start the bending of the wire ends during that time.

It will be recalled that the rods 46 on which the dogs 44 rest, have a non-yielding connection with the cam operated yoke 60 while the plungers 34 are yieldingly held on the upper ends of the springs 72 which are stiff enough to lift the plungers 34 and impale the basket rim on the wire portions 193 before the dogs 44 are rocked on their pivots 45. As soon, however, as the basket rim is fully impaled on the wire ends 193 and clamped against the legs of the handle as shown in Fig. 6, the plungers 34 are held thereby against further upward movement, at which time the cam groove 62 imparts a slight further upward movement to the yoke 60 and the stems 46 which rock the bending dogs 44 to the position shown in Fig. 4 and bends the projecting wire ends against the inner face of the basket rim and across the upper edge thereof so that these projecting ends are shaped and located substantially as indicated by dotted lines at 224 in Fig. 5.

The upwardly projecting ends of the wire are then bent against the outer side of the basket rim by a pair of slide bars 225 which are mounted at opposite sides of the bearing 89 under retaining plates 226 and have offset forward ends 227 sliding in slots 242 which are provided therefor in the base flange 87 of the casting 86. The offset ends 227 of these slide bars are closer together than the distance between the legs 26 of the basket handle so as to operate on the upturned extremities of the wire ends at the inner sides of these legs 26, and as these offset ends 227 in the retracted position are along the sides of wire holding assembly of Fig. 9 and directly over the path of feed of the basket handle wire, the outer fingers 156 of the stripper plate 157 are notched as at 228 to accommodate the inner lower corners of the offsets 227 and the offset 227 at the wire feed side of the machine is under cut as at 229 to guide the wire into position in the holding device of Fig. 9.

Figure 6:
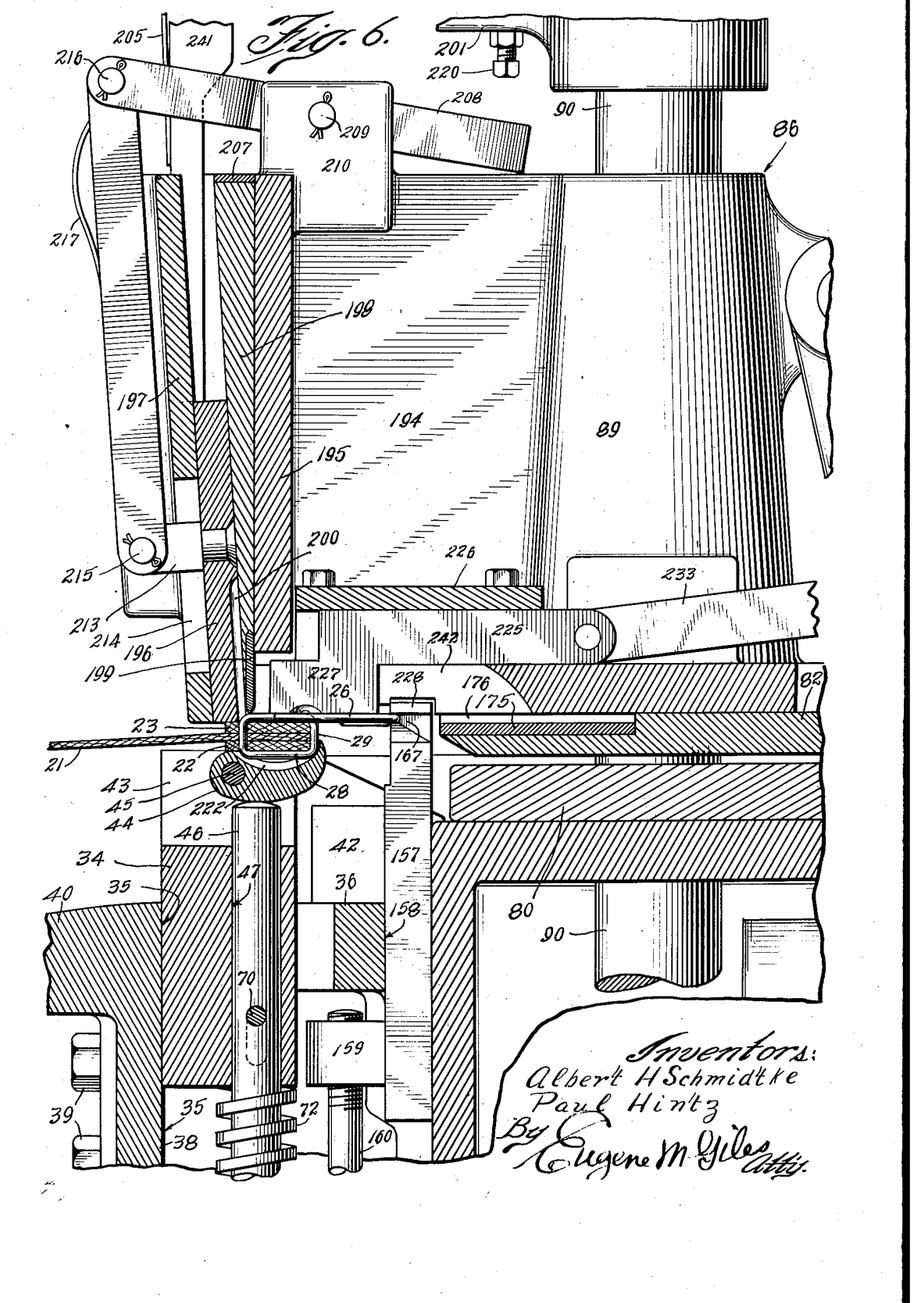
Fig. 6 is a view similar to Fig. 5 but showing the mechanism at the completion of the handle attaching operation.

A rocker shaft 230 is mounted in a bearing 231 at the rear of the upright shaft bearing 86 and has a pair of depending arms 232 with which the slides 225 are connected by links 233, and this shaft 230 also has another arm 234 connected by a rod 235 with a slotted head 236 which embraces the main shaft 48 and has a cam roller 237 thereon which is engaged by a cam 238 at the proper time to project the slide bars 225 forwardly and bend the handle wire ends down against the outer side of the basket rim as shown in Fig. 6, the return movement of the slides 225 from the wire end bending position of Fig. 6 to the retracted position of Fig. 5 being effected, upon release of the cam 238, by the spring 239 which exerts a rearward pulling tendency on one of the arms 232.

In the operation of this machine the basket is placed in position as indicated at 20 in Fig. 3 with the bottom portion of the rim within the crescent 33 and the portion of the rim where the handle is to be attached slipped over the shoe 41 and anvil bracket 36 to a position butting against the stops 42. The pedal 56 is then momentarily depressed to permit the clutch 53 to engage the shaft 48 with the constantly driven pulley 52 and as the shaft 48 starts to rotate, the slide or former plate 82 is projected forwardly by the corresponding rotation of the cam 178 and cuts off from the wire 102, which was fed into the position shown in Fig. 7 at the conclusion of the last preceding handle attaching operation, a handle length of wire and bends this wire around the block 97 into the form shown at 25ᵃ in Fig. 8. The eccentric 96 on the shaft 48 is timed with the cam 178 so that as soon as the ends of the handle legs are bent around in parallel relation under the slide 196, the shaft 90 starts to move downwardly and bends the handle leg ends down to the position 193 while the handle legs are supported on the outwardly projected former or slide 82. The cam 57 is also arranged so that the cam groove 62 starts lifting the yoke 60 at the proper time so that the basket rim is lifted up and impaled on the wire ends 193 as soon as they are bent down to the impaling position, this being accomplished by starting the elevation of the plungers 34 at or slightly before the instant turning down of the wire ends 193 and in suitable timed relation with the slides 82 and 196 so that the outer ends of the slide 82 remain in the forwardly projected position to support the wire as the ends 193 are bent downwardly but are retracted far enough before the basket rim is lifted up, so that the outer end portions of the handle legs against which the basket rim is clamped are exposed on their under sides by the time the basket rim is lifted up thereagainst by the plungers 34.

As the basket rim is being impaled on the handle wire ends 193 these wire ends come in contact with the bending dogs and are slightly bent thereby and when the basket rim is fully impaled the dogs 44 are kicked upwardly by the stems 46 and bend the handle wire ends against the basket rim in the manner shown in Fig. 6 but with the extremities of the wire projecting up above the basket rim. As soon as the handle wire ends are bent to this position, the slide bars 225 are projected forwardly against the upwardly extending extremities of the wire ends and these extremities are bent down against the outer side of the basket rim as shown in Figs. 1 and 6.

The slide or former plate 82 has been retracted during the basket elevating and handle clinching operations so that the basket handle is freed therefrom and in the final part of the revolution of the shaft 48, the plungers 34 are retracted downwardly to the starting position so as to free the basket rim and at this time the offset 78 of the cam groove 74 acts momentarily on the roller 75 to jerk the stripper plate 157 downwardly and release the attached basket handle from behind the former block 97, the forward ends of the arms 163 being swung downwardly at the time against the returning tension of their springs 166 and the inclined face 171 of the block 153 serving to deflect or kick the cross portion of the handle forwardly from under the rear end of the former block 97 and out of the notches 167—168. As soon as this occurs, the stripper plate 157 and arms 163 return to the normal position to receive the end of the wire 102 which is fed by the feed carriage 112, near the end of each revolution of the shaft 48 into position to provide the next handle, it being understood that all of the above described handle forming and attaching operations occur during a single revolution of the shaft 48 which at the end of each revolution is automatically disconnected from the drive pulley 52 and remains inoperative until the pedal 56 is again depressed.

After the handle 25 has been attached to the basket rim at one side of the basket, the basket is given a half turn so that the attached handle is at the center of the crescent 33 and the upper edge of the basket rim is then pushed in against the stops 42 to the handle attaching position on the anvil bracket 36 and shoe 40 and the pedal 56 again depressed so that another revolution is imparted to the shaft 48 to attach a handle to the opposite side of the basket and reset the machine for the next succeeding handle attaching operation.

While we have shown and described our invention in a preferred form, we are aware that various changes and modifications may be made without departing from the principles of our invention, the scope of which is to be determined by the appended claims.

We claim as our invention:

1. In a machine for attaching wire handles to the rim of a basket, the combination of handle forming and attaching mechanism including a pair of adjoining, successively reciprocable wire bending devices operable in substantially parallel paths, one of which forms the wire into bail shape and the other of which is operable thereafter to bend the ends of the wire along the side of the basket rim, and mechanism operable after formation of the wire into bail shape to drive the ends thereof through the basket rim before the wire ends are bent along the side of the basket rim.

2. In a machine for attaching wire handles to the rim of a basket, the combination of mechanism operable to punch the end portions of the handle wire through the basket rim and to bend the said end portions outwardly toward the center portion of the handle wire and over the top edge of the rim, means operable thereafter to bend the extremities of the wire end portions against the outer side of the basket rim, and a wire holding member engaged with the center portion of the handle wire throughout the punching operation of said mechanism and the bending operation of said means.

3. In a machine for attaching wire handles to the rim of a basket, the combination of mechanism operable to bend a length of wire into the form of a handle with substantially parallel legs and laterally extending attaching portions at the outer ends of the legs, means for moving the basket to impale the rim on said attaching portions, said basket moving means including devices which are operable to bend the ends of said attaching portions toward and across the top edge of the basket rim, and wire holding means engaged with the center portion of the length of wire throughout the bending thereof in handle form and the impaling of the basket rim on the attaching portions of the handle.

4. In a machine for attaching wire handles to the rim of a basket, the combination of handle supporting means, propelling mechanism operable to advance the basket toward and impale the basket rim on the handle ends and to clamp the basket rim against said supporting means, and devices on said propelling mechanism and brought into action by the clamping engagement of the propelling mechanism against the basket rim to bend the handle ends toward and across the top of the basket rim.

5. In a machine for attaching bail shaped wire handles to the rim of a basket, the combination of two sliding devices, one of which is operable to bend end portions of the bail legs laterally from the plane of the bail shaped handle and to hold said bent end portions in position to impale the basket rim and the other of which is operable substantially at right angles to the first mentioned device and bends the extremities of said bent end portions against the outer side of the basket rim.

6. In a machine for attaching wire handles to the rim of a basket, the combination of a pair of parallel sliding devices and a sliding device operable substantially at right angles thereto, one of said parallel sliding devices being operable to bend a length of wire into handle form and the sliding device at right angles being operable to bend the end portions of the wire laterally to provide attaching portions and the other parallel device being operable to bend the ends of said attaching portions against the outer side of the basket rim, and holding means engaged with the center portion of the length of wire throughout the aforesaid operations of said sliding devices.

7. In a machine for attaching wire handles to the rim of a basket, the combination with handle forming and driving facilities, of a wire feed comprising a reciprocable carriage, a crank, and spaced abutments on the carriage engaged alternately by the crank for reciprocating the carriage, each abutment being shiftable by the crank to opposite sides of the axis of rotation of the crank.

8. In a machine for attaching wire handles to the rim of a basket, the combination with handle forming and driving facilities, of a wire feed comprising a reciprocable carriage, a crank, and spaced abutments on the carriage engaged alternately by the crank for reciprocating the carriage, said abutments being adjustable to and from one another and shiftable by the crank to opposite sides of the axis of rotation of the crank.

9. In a machine for attaching wire handles to the rim of a basket, the combination with handle forming and driving facilities, of a wire feed comprising a reciprocable carriage, a crank, spaced abutments on the carriage engaged alternately by the crank for reciprocating the carriage, and a friction brake for arresting movement of the carriage as it nears one end of its reciprocable movement.

10. In a machine for attaching wire handles or the like to the rim of a basket, the combination of a support for the basket rim, mechanism operable to bend a length of wire into handle like form with spaced substantially parallel legs connected at one end and with a laterally extending attaching portion at the other end of each leg, means operable to punch said attaching portions through the basket rim so that parts thereof project through the rim, mechanism at one side of the basket rim operable to engage and bend said projecting parts toward the connected ends of the said legs and across the top edge of the basket rim, and a reciprocable slide operable at the other side of the basket rim to engage and bend the extremities of said projecting parts away from the connected ends of said legs and against the last mentioned side of the basket rim.

11. In a machine for attaching wire handles or the like to the rim of a basket, the combination of a support for the basket rim, mechanism operable to bend a length of wire into handle like form with spaced substantially parallel legs connected at one end and with a laterally extending attaching portion at the other end of each leg, means operable to punch said attaching portions through the basket rim so that parts thereof project through the rim and to bend said projecting parts toward the connected ends of the said legs and across the top edge of the rim, and bending means slidable outwardly along the handle legs toward the attached ends thereof to engage and bend the extremities of said projecting parts away from the connected ends of said legs and along the side of said legs and against the side of the basket rim.

12. In a machine for attaching wire handles or the like to the rim of a basket, the combination of a support for the basket rim, mechanism operable to bend a length of wire into handle like form with a middle portion having a leg at each end and a laterally extending attaching portion at the end of each leg, means operable to punch said attaching portions through the basket rim so that parts thereof project through the rim and to bend said projecting parts toward the said middle portion and across the top edge of the rim, bending means operable to bend the extremities of said projecting parts away from the middle portion of the handle and against the side of the basket rim and a holder within which the middle portion of the handle is locked during the operation of said bending means.

ALBERT H. SCHMIDTKE.
PAUL HINTZ.